(12) United States Patent
McGinn et al.

(10) Patent No.: US 8,356,475 B2
(45) Date of Patent: Jan. 22, 2013

(54) CATALYSTS WITH SLOW, PASSIVE RELEASE OF ALKALI IONS

(75) Inventors: Paul J. McGinn, Granger, IN (US); Hongmei An, Houston, TX (US)

(73) Assignee: University of Notre Dame Du Lac, Notre Dame, IN (US)

( * ) Notice: Subject to any disclaimer, the term of this patent is extended or adjusted under 35 U.S.C. 154(b) by 362 days.

(21) Appl. No.: 12/021,108

(22) Filed: Jan. 28, 2008

(65) Prior Publication Data
US 2009/0031712 A1 Feb. 5, 2009

Related U.S. Application Data

(60) Provisional application No. 60/898,851, filed on Feb. 1, 2007, provisional application No. 61/012,870, filed on Dec. 11, 2007.

(51) Int. Cl.
*F01N 3/10* (2006.01)
*B01J 21/00* (2006.01)
*B01J 23/02* (2006.01)

(52) U.S. Cl. ............ 60/299; 502/250; 502/344

(58) Field of Classification Search ............ None
See application file for complete search history.

(56) References Cited

U.S. PATENT DOCUMENTS

| | | | |
|---|---|---|---|
| 3,810,744 A * | 5/1974 | Dumbaugh et al. | 65/42 |
| 4,001,039 A | 1/1977 | Elmore et al. | |
| 4,003,976 A * | 1/1977 | Komatsu et al. | 423/213.5 |
| 5,250,272 A | 10/1993 | Knorre et al. | |
| 5,338,715 A | 8/1994 | Iida et al. | |
| 6,423,415 B1 | 7/2002 | Greene et al. | |
| 6,447,731 B1 | 9/2002 | Sun et al. | |
| 6,631,612 B1 | 10/2003 | Setoguchi et al. | |
| 2004/0065078 A1 * | 4/2004 | Schafer-Sindlinger et al. | 60/295 |
| 2004/0259731 A1 * | 12/2004 | Yan | 502/439 |
| 2006/0018806 A1 | 1/2006 | Ziebarth et al. | |

FOREIGN PATENT DOCUMENTS

| | | | |
|---|---|---|---|
| GB | 2426246 | * | 11/2006 |
| WO | 0218128 A1 | | 3/2002 |
| WO | 2006044268 | | 4/2006 |

OTHER PUBLICATIONS

"PCT International Preliminary Report of Patentability," issued by the International Bureau on Aug. 13, 2009, in connection with international application No. PCT/US2008/052480, (7 pages).

"PCT International Search Report and the International Written Opinion of the International Searching Authority" issued by the International Searching Authority/ United States on Aug. 21, 2008 in connection with the international application No. PCT/US2008/052480 (10 pages).

(Continued)

*Primary Examiner* — Emily Le
*Assistant Examiner* — Sarah A Slifka
(74) *Attorney, Agent, or Firm* — Keith R. Jarosik

(57) ABSTRACT

Described is a method of slowly releasing a catalyst for, inter alia, the purpose of soot oxidation in a particulate filter. An example method includes incorporating an alkali metal oxide in a glass. Slow leaching of the alkali from the glass provides a means to gradually deliver the catalyst over extended periods. Additionally, the example method includes increasing the amount of alkaline metal ions that may be leached from the glass.

26 Claims, 9 Drawing Sheets

OTHER PUBLICATIONS

F.E. Lopez-Suarez, et al; "Potassium Stability in Soot Combustion Perovskite Catalysts", Topics in Catalysis, vol. 52, No. 13-20, 2097-2100, Published online: Jul. 21, 2009; DOI 10.1007/s11244-009-9385-z.

Douglas W. McKee; "Mechanisms of the alkali metal catalysed gasification of carbon", FUEL, vol. 62, Feb. 1983, pp. 170-175.

B.A.A.L. Van Setten, et al; "Stability of catalytic foam diesel-soot filters based on $Cs_2O$, $MoO_3$, and $Cs_2SO_4$ molten-salt catalysts", Applied Catalysis B: Environmental vol. 42, Jun. 2003, pp. 337-347.

Chiao Lin et al., Soot Oxidation in Fibrous Filters. 1. Deposit Structure and Reaction Mechanisms, Feb. 12, 1988, pp. 891-898, American Chemical Society.

SEM-COM Production Glasses, Apr. 14, 2010, pp. 1-4.

* cited by examiner

CATALYSTS WITH SLOW, PASSIVE RELEASE OF ALKALI IONS

RELATED APPLICATION

This application claims priority to U.S. Provisional Patent Application No. 60/898,851, entitled "Application of Glass Catalysts for Diesel Soot Oxidation," filed on Feb. 1, 2007, and U.S. Provisional Patent Application No. 61/012,870, entitled "Catalyst Development for Diesel Particulate Filters," filed on Dec. 11, 2007, which are hereby incorporated by reference in their entireties.

FIELD OF THE DISCLOSURE

This disclosure relates generally to catalysts, and, more particularly, to catalysts with slow, passive release of alkali ions.

BACKGROUND

Combustion engines such as diesel engines typically produce unburned fuel residues or particulates i.e., soot, which is usually composed mainly of amorphous carbon. Exhaust from vehicles containing soot becomes airborne particulate matter and increases pollution, particularly in urban areas. Soot also is carcinogenic and, therefore, very hazardous to the lungs and general health when inhaled.

Diesel Particulate Filters (DPFs) have been developed to remove soot from the exhaust gas of diesel engines. After a period of time, however, enough soot may have collected on a DPF to cause an increase in pressure drop across the DPF, which results in compromised operation of the engine. Therefore, the DPF must be cleaned of accumulated soot. Some DPFs are designed for single use and are disposable, while other filters are designed to burn off the soot through carbon soot combustion or oxidation, which is known as filter regeneration. Filter regeneration may occur actively through a fuel burner that heats the soot to combustion levels or passively through the use of a catalyst.

Several types of filters have been used with various vehicles. For example, Flow-Through Oxidation Catalysts are used in filters to remove diesel particulate matter, CO and hydrocarbons, including the ones that form the soluble organic fraction of the total particulate mass. The oxidation catalyst used with Flow-Through Oxidation Catalysts is typically a platinum-rhodium-platinum catalyst deposited on a flow through monolith, where soot particles are not trapped. The oxidation catalysts convert CO and hydrocarbons at ~200° C. but achieve less than 5% oxidation of the particulate matter. Platinum, however, is an excellent $SO_2$ oxidation catalyst. At temperatures above approximately 300-350° C., the catalyst oxidizes $SO_2$ to $SO_3$, which quickly combines with water to form sulfuric acid and contributes significantly to the total particulate mass. To limit emissions above 300° C., a more specific catalyst should be used to minimize $SO_2$ oxidation. A tailored catalyst with comparable activity may be made by alloying less active oxidation catalysts, rhodium and palladium. In addition, base metals also may be used to tailor the activity of platinum such as, for example, where only soluble organic portions of the total particulate matter need to be lowered to meet any particular emission standards.

In addition, $NO_x$-Aided CRTs are a type of filter typically used with trucks and buses. The $NO_x$-Aided CRT includes a wall-flow monolith with an upstream flow-through diesel oxidation catalyst, called a preoxidizer, such as a platinum catalyst, and a cordierite wall-flow monolith downstream. The preoxidizer converts 90% of the CO and hydrocarbons to $CO_2$ and 20-50% of the NO to $NO_2$; the particles are trapped on a cordierite wall-flow monolith and subsequently oxidized by the $NO_2$. $NO_x$-Aided CRTs effectively oxidize all of the carbon components in diesel exhaust that include small particles and unregulated compounds. In addition, $NO_x$-Aided CRTs reduce $NO_x$ concentration by approximately 3-8%. Furthermore $NO_x$-Aided CRTs have a reasonable temperature window of approximately 200-450° C. (200° C. is needed for CO and hydrocarbon oxidation, and 450° C. relates to the chemical equilibrium between NO and $NO_2$, which is not favorable above 450° C.). Also, $NO_x$-Aided CRTs have higher stability because of the continuous regeneration, which avoids extreme temperatures and enhances stability. However, these $NO_x$-Aided CRT systems also have some limitations including requiring low-sulfur fuel, which makes wide-scale introduction unfeasible.

For light-duty vehicles such as, for example, passenger cars, an Integrated Catalytic Trap filter may be used that includes a silicon carbide wall-flow monolith, engine-controlled heating through fuel-injection-timing controls, cerium fuel additives and a preoxidizer (e.g., platinum catalyst). These systems include two catalyst technologies and make several catalyst mechanisms available including, for example, cerium-aided periodically induced self-supporting regeneration; cerium-catalyzed spontaneous local regeneration reactions at low temperatures; cerium-catalyzed continuous soot oxidation at high temperatures; cerium-catalyzed reduction of black smoke after some initial cerium deposition in the combustion chamber and exhaust system (cerium fuel additive reduces the raw particulate emissions by approximately 20%); platinum-catalyzed oxidation of volatile hydrocarbons and CO; platinum-catalyzed production of $NO_2$ at favorable temperatures; and platinum- and cerium-catalyzed synergetic oxidation of soot. However, this system is oftentimes complex and expensive and the trap should be cleaned periodically to remove cerium deposits.

Furthermore, alkali metals such as potassium improve the activity of catalysts for carbon soot combustion. Unfortunately, because of the high temperatures needed for carbon soot combustion and because traditional $K_2CO_3$, KOH, and $KO_2$, potassium catalysts typically have low thermal stability, if the potassium is mobile and not tightly bound in the compound (i.e. if it is "free" potassium) potassium may be lost via evaporation or sublimation, etc. This results in a subsequent reduction in desired catalytic activity and, therefore, limits the usefulness of some alkali metal containing compounds as catalysts if there is no way to replenish the catalyst over time. This is true in a DPF environment and in other industries such as, for example, in coal gasification reactions wherein potassium-based catalysts are quickly consumed as a result of the combustion process.

U.S. Pat. No. 6,631,612 describes a device and method of filter regeneration used to avoid a reduction in desired catalytic activity. The device and method described in U.S. Pat. No. 6,631,612 adds seawater containing alkali metals to the filter to replenish the alkali metals used a catalyst in the filter regeneration. This device and method require a readily available supply of seawater, which is impractical for land-based vehicles. Furthermore, the device and method described in U.S. Pat. No. 6,631,612 require constant, repetitive steps, i.e., adding seawater, which can be onerous. This is an example of "active" catalyst replenishment, as opposed to "passive" replenishment as detailed herein.

DETAILED DESCRIPTION

Described herein are methods of slowly releasing catalysts to promote soot oxidation. The example catalysts described herein include an oxide catalyst and a glass catalyst. The example catalysts described herein can be used to facilitate removal of particulate carbon and residual hydrocarbonaceous material from engine exhaust filters, especially particulates emanating from diesel engines. In the example potassium-doped catalysts described herein, the potassium is made available through a controlled-release mechanism. In the case of the example crystalline oxide ($K_2Mn_2O_8$), the delivery occurs through gradual decomposition of the starting compound. In the case of the glass described later, this occurs through ions leaching from a glass. Both mechanisms provide a means to slowly deliver the catalyst (K ions) for soot oxidation.

A first example catalyst for use in a soot filter is the oxide catalyst, which is described herein. Any number of methods such as, for example, solid state oxide processing, sol-gel processing, etc. are suitable to produce the example oxide compound in a powder form. One example method is shown in FIG. 1.

Figure 1:
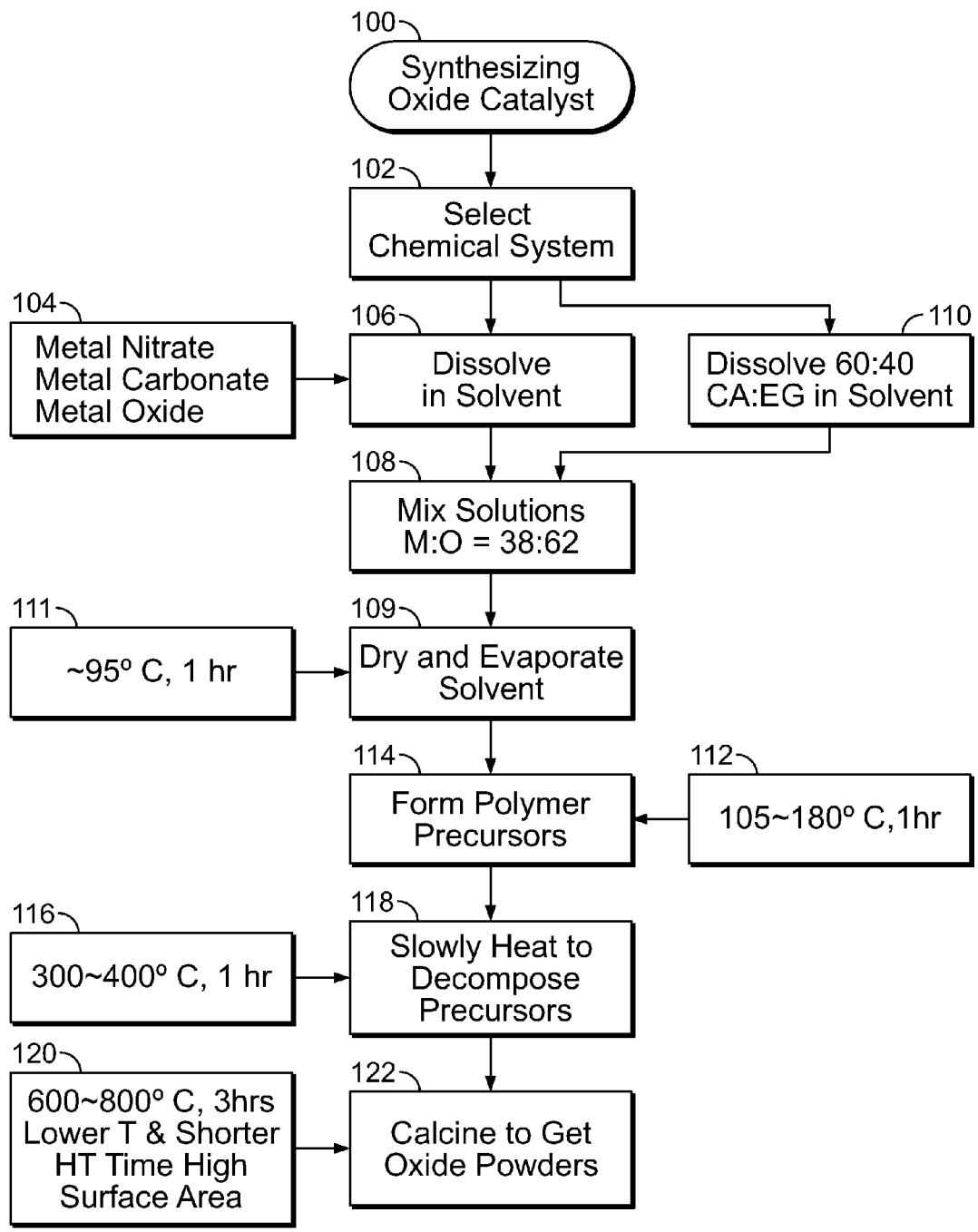
FIG. 1 is flow chart describing an example process of forming an example oxide catalyst.

In particular, the example oxide catalyst may be synthesized by the example synthesis process 100 shown in FIG. 1. In the example process 100, a chemical system is chosen (block 102), which may be, for example, mixed and complex metal oxides, including alkali-substituted perovskite and spinel type oxides. The system may include binary, ternary, or even more components. The component elements may focus on alkali metals and transition metals such as, for example, manganese, molybdenum, vanadium, lanthanum, copper, cerium, and iron.

Metal nitrates, carbonates, or oxides may be used as the source of metal cations (block 104) and dissolved in a solvent (block 106). The metals and the solvents are chosen based on their properties to form stable solution precursors with appropriate element ratios so the concentration of each component is not too low. The precursors may include $Cu(NO_3)_2.3H_2O$, $Ce(NO_3)_3.6H_2O$, $Co(NO_3)_2.6H_2O$, $La(NO_3)_3.6H_2O$, $Fe(NO_3)_3.9H_2O$, $MoO_3$, $Mn(NO_3)_2$, $LiNO_3$, $CsNO_3$, $NaNO_3$, $V_2O_5$ or any other suitable precursor. The solvents could be, for example, $H_2O$ (for most metal salts), or $NH_3.H_2O$ (for $MoO_3$), or any other suitable solvent. Ethylene glycol ("EG") also may be used as a complexing agent.

At least a portion of the example process 100 is known as the Polymerizable Complex Method ("PCM"), which is also known as the in-situ polymerization route. In PCM, the metal ions are dissolved in solution with a chelating agent (block 108), which itself may be formed by, for example, combining citric acid ("CA") and a polyhydroxyl alcohol such as, for example, EG, with a solvent (block 110). In this example, the CA and EG may be dissolved in distilled water in a molar ratio of approximately 60 to 40. The metal ions are chelated by the CA and are evenly distributed throughout the solution. These organic precursor solutions may be transferred to an alumina crucible along with metal nitrate solutions in a molar ratio of approximately 38 metal to 62 organic, for example. Though other ratios maybe used as well.

After the metal cations form stable chelated solutions in the citric acid, they are dried (block 109). In one example, the chelated solutions are dried at, for example, 95° C. for a suitable time, such as, for example one hour (block 111) to evaporate the solvent and to form viscous resins. Heat is applied at, for example, approximately 105-180° C. for an hour or any suitable time (block 112) to the resins so the EG undergoes polyesterficiation and forms polymer precursors (block 114). During this time, the polymerization occurs between carboxylic acid groups and alcoholic groups. The result is a polymer resin with homogenously distributed metal ions. Heat may also be applied at, for example, approximately 300-400° C. for an hour or any suitable time (block 116) to slowly heat the combination to decompose the precursor, i.e., the resin, (block 118). Additional heat may be added, for example 600-800° C. for three hours or any suitable time (block 120) to calcinate and form the oxide powder (block 122). Because the PCM is based on a liquid mixing process, the metal ions are mixed on a molecular level facilitating a lower processing temperature and a faster synthesis time than a comparable solid state process. The oxide powders produced in this manner typically have higher surface areas than solid state processed powders.

There have been many reported catalysts that show activity for diesel soot combustion. These include noble metals, single, mixed, and complex metal oxides as well as low melting point compounds. Alkali doped compounds such as, for example, those based on potassium, lithium, cesium, or sodium, show better catalytic activity than those compounds without alkali doping. In particular, potassium is a very active alkali metal catalyst for carbon oxidation and many potassium-rich oxides ignite soot at about 300° C., which is among the lowest known oxidation temperatures of all the alkali metals.

Figure 2:
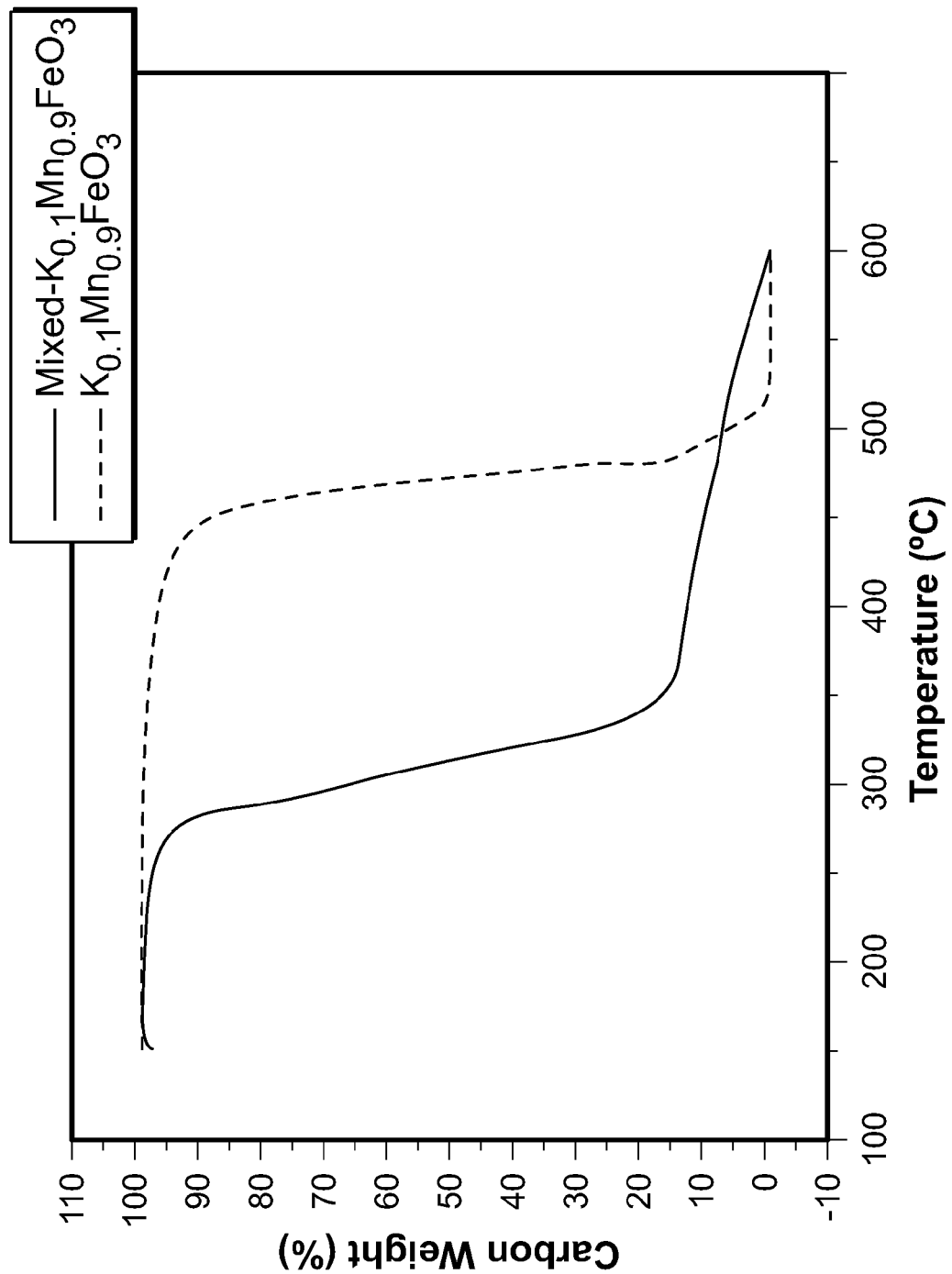
FIG. 2 shows a temperature versus carbon weight percentage comparison for a mixed-$K_{0.1}Fe_{0.9}MnO_3$ system and a $K_{0.1}Fe_{0.9}MnO_3$ system.

The active catalytic species in the example potassium-doped catalysts described herein is termed "free" potassium, i.e., potassium that is mobile and not tightly bound in a lattice or matrix. This is illustrated by the example of $K_{0.1}Fe_{0.9}MnO_3$. If the compound is synthesized by reacting at elevated temperatures (yielding $K_{0.1}Fe_{0.9}MnO_3$), the potassium is bound in a perovskite lattice while in a mixed-$K_{0.1}Fe_{0.9}MnO_3$ system ($Fe_{0.9}MnO_3$ and $K_2CO_3$ powders were mixed to have the ratio of K:Fe:Mn=0.1:0.9:1.0, termed "mixed-$K_{0.1}Fe_{0.9}MnO_3$"), potassium is in a more active/reactive state in the form of potassium carbonate. In the mixed-$K_{0.1}Fe_{0.9}MnO_3$ system, the ignition temperature is lowered to about 300° C., while the ignition temperature is only lowered to about 450° C. in the $K_{0.1}Fe_{0.9}MnO_3$ system, as shown in FIG. 2. Thus, systems with potassium in a "free" or mobile state more effectively lower the ignition temperature. The high activity of potassium-rich catalysts described herein is due to the existence of dissolvable, active potassium such as, for example, potassium in the form of carbonate, oxides, hydroxides, or other binary or ternary oxides that can be decomposed by polar solvents and release potassium cations such as, for example, $KFeO_2$, which decomposes into $Fe_2O_3$ and $K^+$ in water or methanol. The activity of the potassium-rich catalysts is not a synergetic function of transition metal elements and potassium in the oxide lattice.

Furthermore, as mentioned above, the use of polar solvents may improve the soot/potassium contact and thereby lower the soot ignition temperature. Water vapor, in particular, is present in diesel exhaust and when condensed, likely will dissolve potassium cations and create intimate soot-potassium contact. The more intimate the contact, the greater the catalytic activity. Thus, such potassium-containing catalysts could be advantageous for use in diesel soot combustion. However, potassium has low thermal stability, which may be a factor considering the high temperatures associated with a diesel engine.

Figure 3:
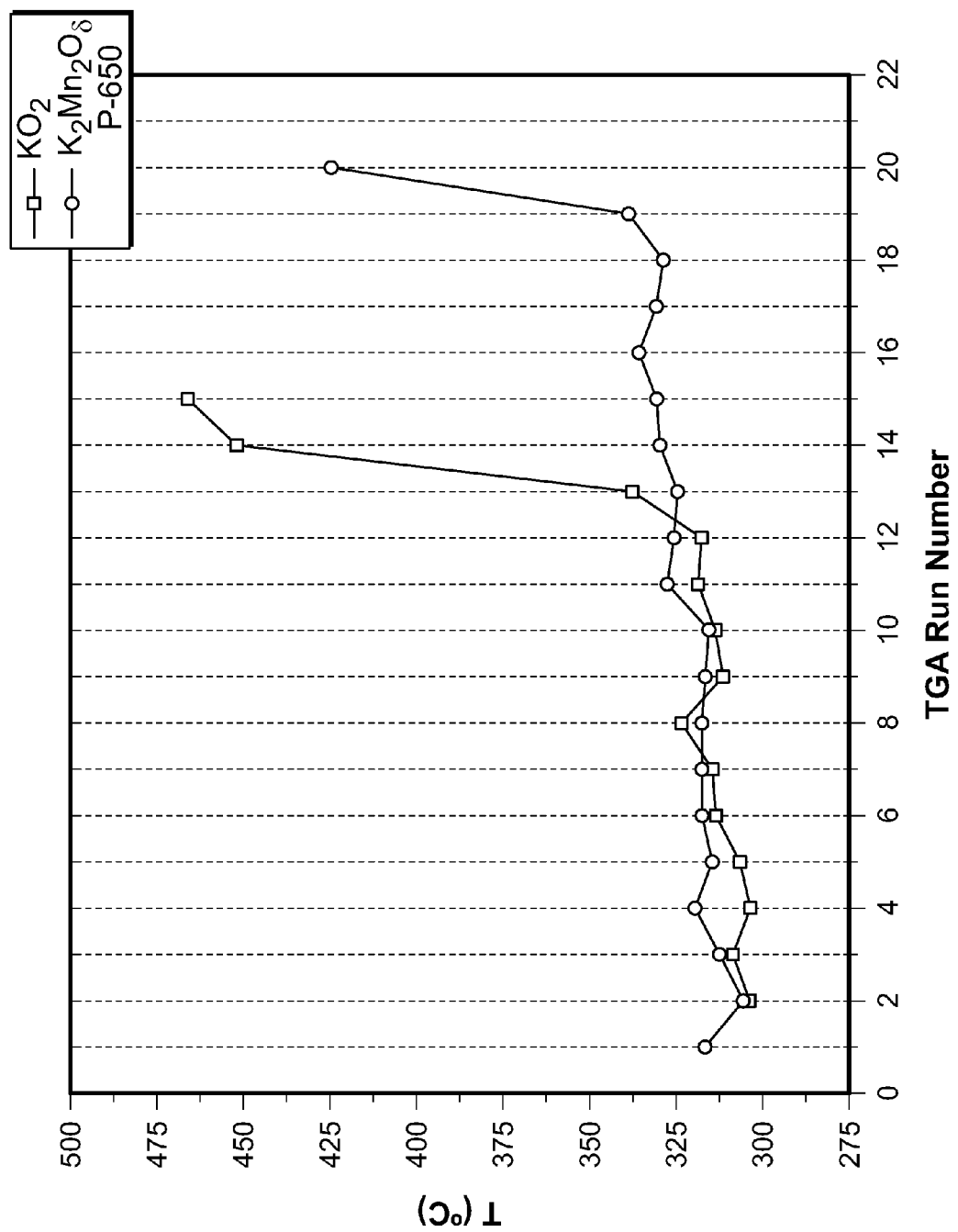
FIG. 3 shows thermogravimetric analysis curves comparing $KO_2$ and $K_2Mn_2O_8$ soot oxidation catalysts.

FIG. 3 shows thermogravimetric analysis (TGA) results comparing $KO_2$ and $K_2Mn_2O_8$ soot oxidation catalysts. TGA is a type of testing that is performed on samples to determine changes in weight in relation to change in temperature. Shown are the carbon soot ignition temperatures, $(T_{ig})$, as a function of repeated cycling in the TGA. Despite starting with equivalent amounts of potassium in the two cases, the $KO_2$ activity diminishes after the $13^{th}$ cycle, while the $K_2Mn_2O_8$ does not start decreasing until after 19 combustion cycles. X-ray diffraction data during this cycling verifies that the $K_2Mn_2O_8$ (K:Mn ratio of 1:1) slowly transforms to $K_2Mn_4O_8$ (K:Mn ratio of 1:2), releasing "free" K in the process, providing the catalyst for soot combustion.

Comparing the TGA cycling lifetime results for $K_2Mn_2O_8$ and $KO_2$, shows that $K_2Mn_2O_8$ has longer lasting activity than $KO_2$. The longer activity life is due to the slower loss of potassium from $K_2Mn_2O_8$ than from $KO_2$, due to the K being delivered more slowly as the phase transformation from $K_2Mn_2O_8$ to $K_2Mn_4O_8$ occurs. Therefore, the slow release potassium results in an increased catalyst activity lifetime.

The presence of free or mobile potassium can be reduced by sublimation during the soot combustion reaction, which results in the loss of active potassium on the catalyst surface over time and, therefore, decreases the activity stability of the catalyst. To counteract the reduction of potassium, a method for passive, slow release, which is also known as "timed released" or "controlled released" of catalysts or compounds to provide for replenishment of the active catalyst may be used. This timed release may be obtained by not only structure and composition modifications of potassium-bearing materials such as, for example, $K_2Mn_2O_x$, (discussed above) but also by $KAlSi_3O_8$, $K(Fe,Mg)_3AlSi_3O_{10}(OH)_2$, intercalation compounds, and any other compounds that allow for slow release of active catalyst ions through processes including ion exchange, leaching, etc.

An alternative example catalyst utilizes a glass that can slowly release a catalyst. An alternative example method 400 of forming a glass catalyst for use in a soot filter is described herein and shown in FIG. 4. The alternative example method 400 includes combining a silicon oxide with an alkali bearing compound such as an oxide or carbonate, to form a mixture (block 402), which is then heated (block 404). A glass formed during the process is removed (block 406), cooled (block 408), and reduced to a powder (block 410) to form the catalyst used in the soot filter.

Figure 4:
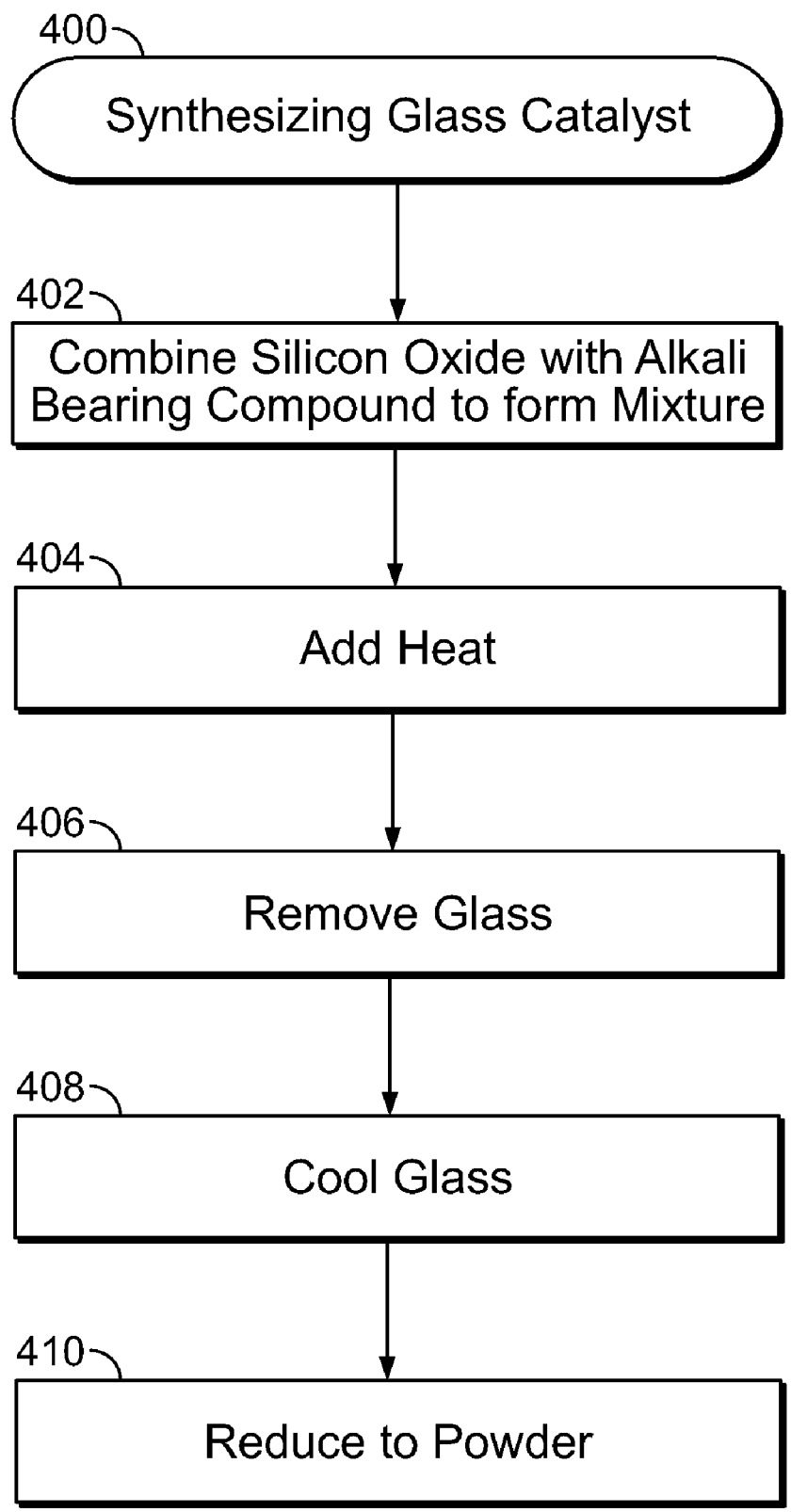
FIG. 4 is flow chart describing an example process of forming an example glass catalyst.
Figure 5:
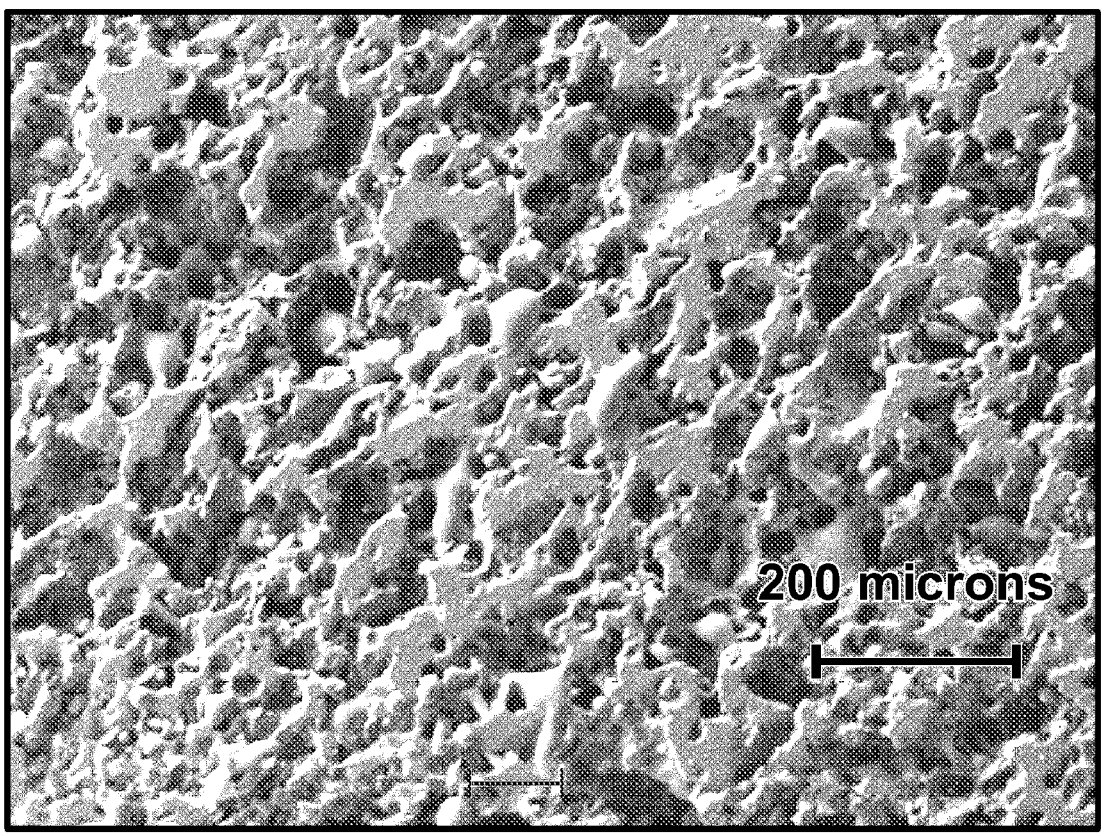
FIG. 5 is an enlarged view from a scanning electron microscope (SEM) of an example glass catalyst made from the example process of FIG. 4.

FIG. 5 is an enlarged view from a scanning electron microscope (SEM) of an example glass catalyst made from the example process of FIG. 4, that has been dispersed onto, and subsequently sintered to a cordierite substrate. A glass is an amorphous solid completely lacking in long range, periodic atomic structure, and exhibiting a region of glass transformation behavior. Any material, inorganic, organic, or metallic, formed by any technique, which exhibits glass transformation behavior is a glass. Thousands of chemical compositions may be made into a glass. Typical glass contains network-formers, modifiers and stabilizers. Network-formers form the random network of glasses such as, for example, $SiO_2$, $Al_2O_3$, $B_2O_3$, $P_2O_5$ and $As_2O_5$. In addition to the network-former, glasses may contain oxides that do not participate in forming the network structure. These oxides are the modifiers such as, for example, $K_2O$ and $Na_2O$. In addition the stabilizers such as, for example, CaO (lime), make the glass strong and water resistant. Without stabilizers, water and humidity may attack and dissolve glass.

Elaborating on the example method 400 of FIG. 1, an example glass, referred to herein as "Glass-1" may be made by combining $SiO_2$, $K_2CO_3$ and $CaCO_3$ to form a combination or mixture (block 402). The mixture may be put into $Al_2O_3$ crucibles and heated to, for example, approximately 1100° C. at 5° C./min. (block 404) and held there for approximately an hour or any suitable time. Because the glass does not wet $Al_2O_3$, the glass generally is easily removed from the crucibles (block 406). The obtained glass may then be ground into a powder and sifted, for example, with sieves (block 410). The glass may have a particle size of about 149 to about 177 microns (80-100 mesh), though other particle sizes may be used as well including down to about one micron or smaller.

The above-mentioned glass catalyst releases potassium from the bulk onto the surface at a controlled rate that is fast enough to supplement the lost surface potassium and, thus, decrease the degradation rate of the catalysts; while also being low enough to keep the catalysts' activity lifetime at a reasonable level. The glass is particularly useful in DPFs because of its suitable potassium release rate, its stability at high temperatures (e.g., >800° C.), and its adequate mechanical strength.

When Glass-1 is used as the catalyst in a wet methanol environment, the soot combustion temperature is about 20° C. higher than when $K_2Mn_2O_8$ is used, but still adequate when compared to other known non-alkali-doped catalysts. This temperature difference relative to $K_2Mn_2O_8$ is possibly due to a lower content of potassium on the glass surface (e.g., about 30%) than on $K_2Mn_2O_8$ (e.g., about 50%). Alternatively, it may be due to the slower leaching rate of potassium from Glass-1 than from $K_2Mn_2O_8$ in certain environments (e.g., methanol). However in alternative environments (e.g., dry, tight contact), Glass-1 may be more active than $K_2Mn_2O_8$.

Figure 6A:
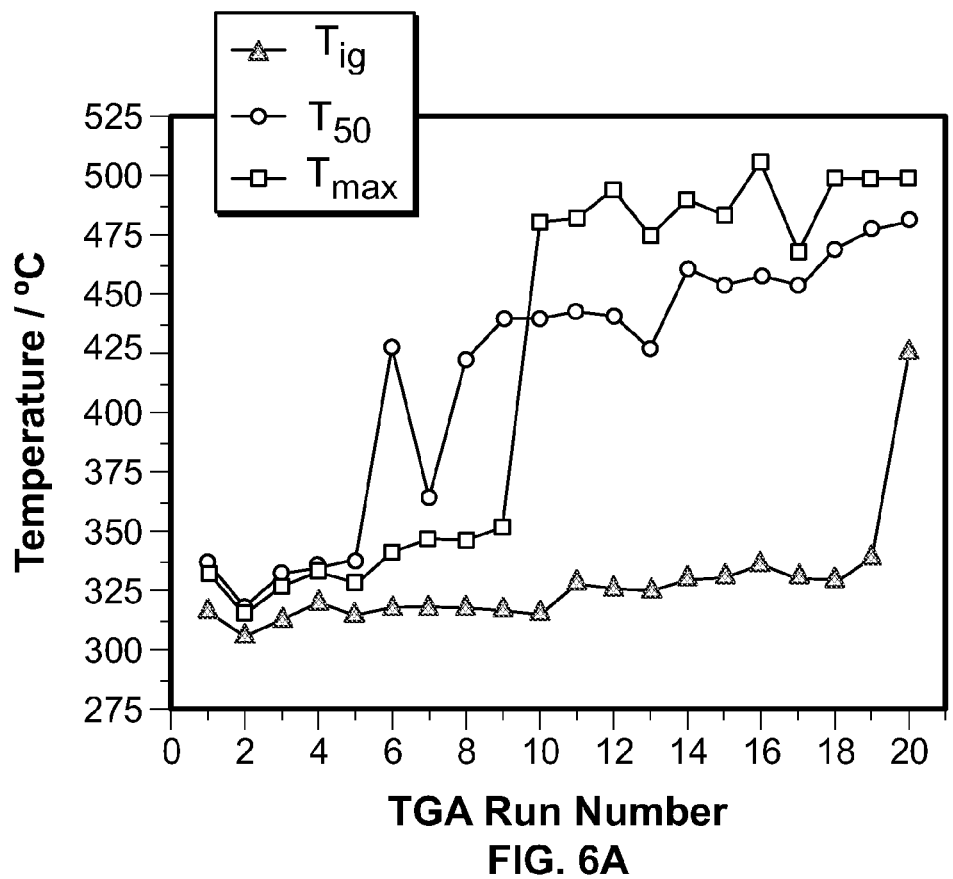
FIG. 6A shows the same $T_{ig}$ curve for $K_2Mn_2O_8$ along with the $T_{50}$ and $T_{max}$ curves.
Figure 6B:
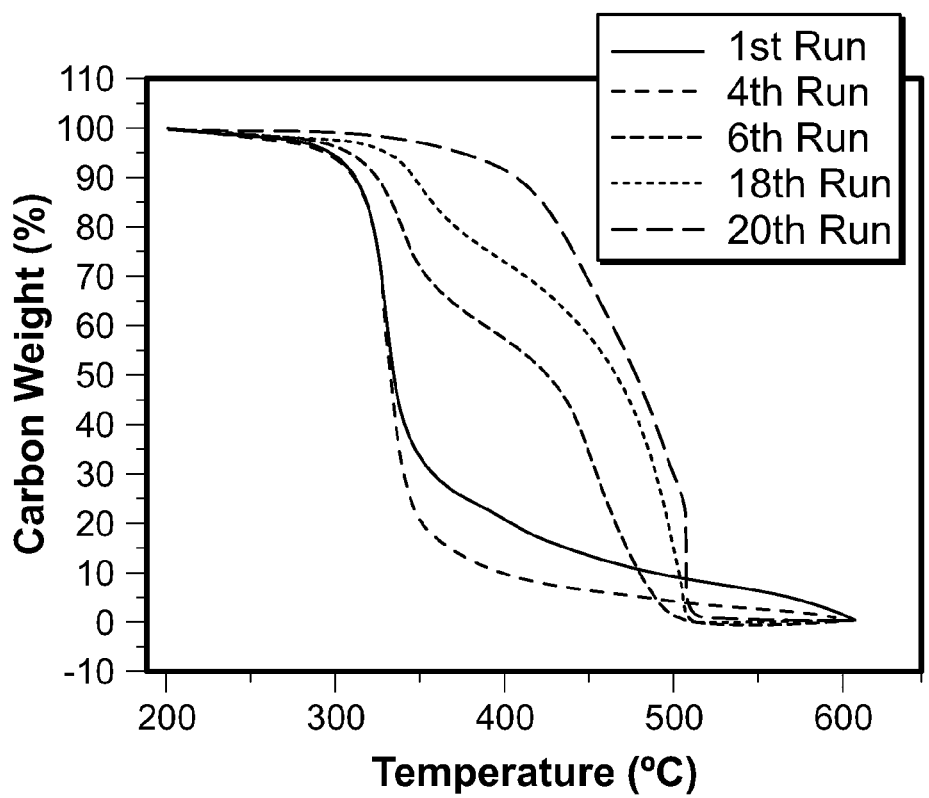
FIG. 6B is a graph showing example thermogravimetric analysis curves for soot combustion using $K_2Mn_2O_8$ as a catalyst.
Figure 6C:
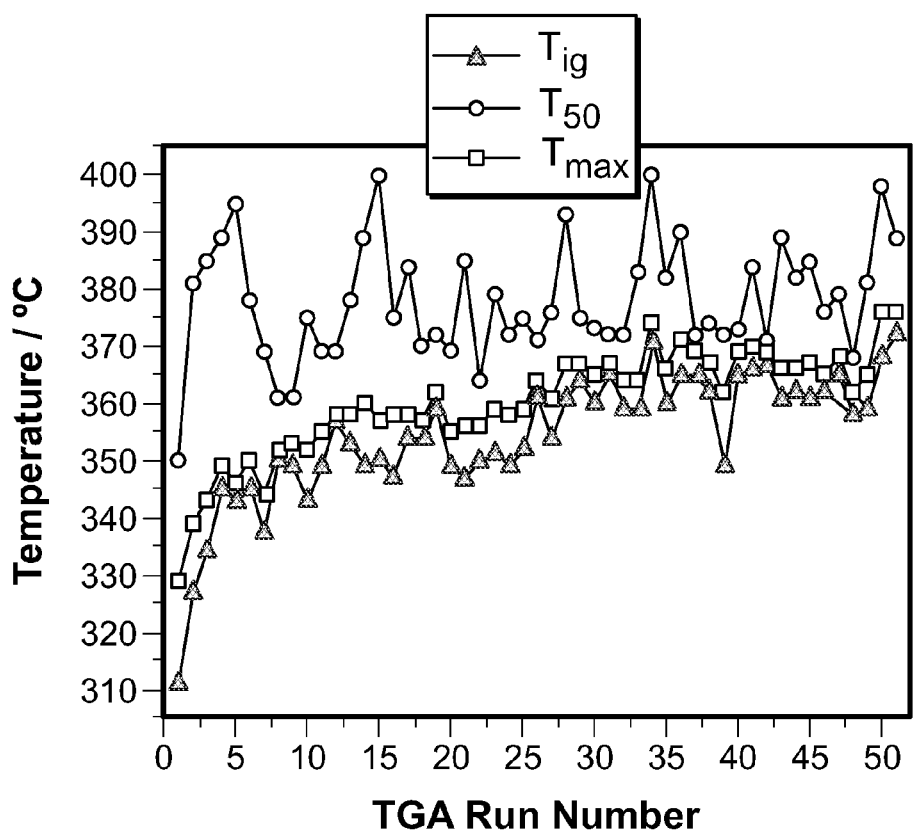
FIG. 6C a graph showing the ignition temperature, ($T_{ig}$), the temperature at which half of the carbon has combusted ($T_{50}$) and the temperature at which maximum soot combustion rate is reached ($T_{max}$) for an example series of thermogravimetric analysis runs for an example potassium glass as a catalyst.
Figure 6D:
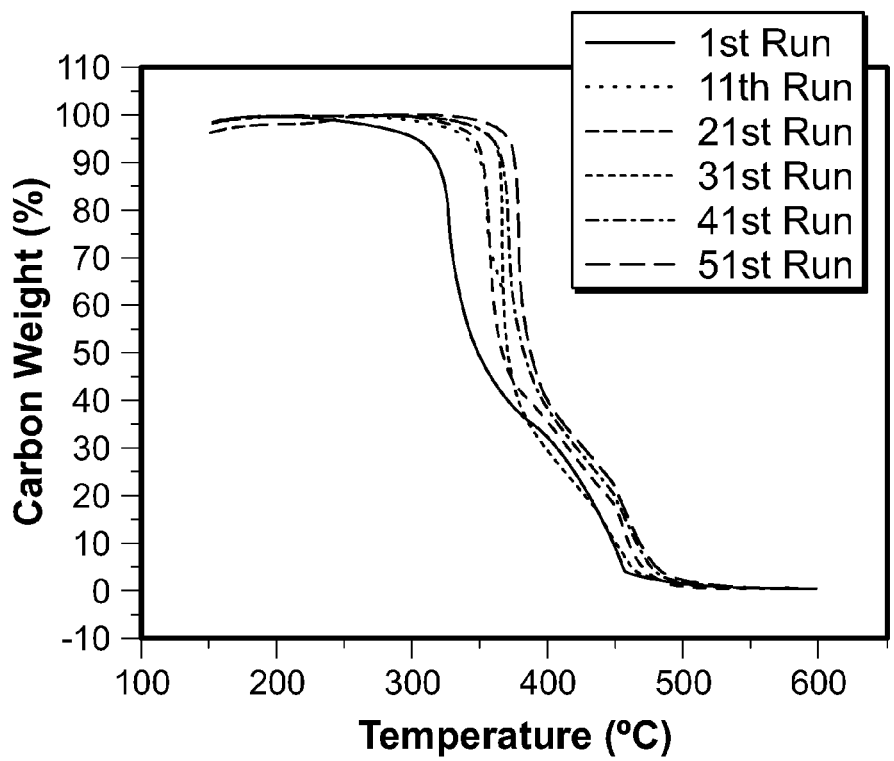
FIG. 6D is a graph showing example thermogravimetric analysis curves for soot combustion using an example potassium glass as a catalyst.

For example, FIGS. 6A and 6C are graphs showing ignition temperature, $(T_{ig})$, the temperature at which half of the carbon has combusted $(T_{50})$ and the temperature at which maximum soot combustion rate is reached $(T_{max})$ for a series of TGA runs for $K_2Mn_2O_8$ and Glass-1, respectively. FIGS. 6B and 6D are graphs showing representative individual TGA curves for soot combustion using $K_2Mn_2O_8$ and Glass-1 as the catalysts, respectively. As shown in FIG. 6A, when $K_2Mn_2O_8$ is used as the catalyst, $T_{ig}$ increases from approximately 325° C. in the first run to approximately 425° C. in the twentieth run. In contrast, as shown in FIG. 6C, when Glass-1 is used as the catalyst, the soot ignition temperature $T_{ig}$ increased from approximately 311° C. in the first run to approximately 372° C. in run number 51. This is about a 61° C. increase after 51 runs. Because most of the carbon is combusted in the first step, $T_{ig}$ and $T_{max}$ change at approximately the same rate. $T_{50}$ of soot combustion varies somewhat in this example, with an average value of about 378° C. within the 51 runs. Therefore, the Glass-1 catalyst has a much longer activity lifetime than the potassium oxide catalyst $K_2Mn_2O_8$. This is because the glass structure facilitates the slow release of $K^+$ ions to the surface, where the ions can continue promoting the soot oxidation reaction.

In this example, Glass-1 is approximately 35% $K_2O$, 52% $SiO_2$, and 13% CaO, but other compositions may be used in other examples. When $SiO_2$ is fixed at about 50%, the soot combustion temperature decreases with an increase in the percentage of $K_2O$. When CaO is fixed at about 10%, the glass activity is maximized when $K_2O$ is between around 35-40%. When the percentage of $K_2O$ was fixed at about 35%, the soot combustion temperature increased with the percentage of CaO. Considering that real soot-catalyst contact is similar to loose contact, the optimum composition for $SiO_2$-$K_2O$—CaO glass is possibly around 50-55% $SiO_2$, 30-35% $K_2O$, and 10-15% CaO. Many other additions or substitutions to the glass can be made including, but not limited to $TiO_2$, $Cr_2O_3$, $Li_2O$, $B_2O$, etc. In addition, the glass may include one or more of various other elements that complement the catalytic activity of sodium such as, for example, Ca, Sr, Ba, Mg, Mn, Cr, V, Ti, Fe, Co, Ni, Cu, Zn, Y, Zr, Nb, Mo, Ru, Rh, Pd, Ag, Cd, Sn, Sb, La, Hf, Ta, W, Ir, Pt, Au, Bi, Ce, Pr, Nd, Sm, Eu, Gd, Tb, Dy, Ho, Er, Tm, Yb and/or mixtures thereof.

Because of the exothermal oxidation of soot there is a local rise in temperature after ignition, the magnitude of which depends on the thermal properties of the filter material (thermal capacity and conductivity) as well as the exhaust temperature. In the worst case, temperatures of approximately 800° C. or higher can occur locally in the filter when the engine is stopped after ignition of the soot in a fully loaded trap. Such a high temperature may lead to sintering or even melting of a glass-based catalyst. Sintering and melting of glass powder will decrease the surface area of the glass and, thus, the catalytic efficiency of the glass. Sintering and melting also may block the micropores of the filter, which will lead to an increased back pressure. Therefore, the glass catalyst should be of optimum composition that has high activity and long activity lifetime, as well as a high softening/melting temperature.

In one example, when the percentage of $SiO_2$ is kept at around 50% and the percentages of CaO and $K_2O$ are varied, the softening temperature of glass dropped with an increase of $K_2O$ content. The same behavior is observed when the percentage of CaO is fixed and the percentages of $SiO_2$ and $K_2O$ are varied. However when the percentage of $K_2O$ is held constant at, for example, around 35%, a maximum softening temperature is observed at about 10% CaO and about 55% $SiO_2$. $K_2CO_3$, for example, may be added as a flux or diffuser to decrease the melting point of the glass. Therefore, reducing the amount of $K_2O$ in glass raises the softening temperature and melting point. However, this also will decrease the amount of active phase in the glass catalyst and also its catalytic activity. When the percentage of $K_2O$ is fixed, the softening temperature will be determined by the relative amounts of other components in the glass. Thus, adding other elements to the class may increase the softening temperature of glass while maintaining activity.

Lubricants used in internal combustion engine oils can contain compounds that include phosphorous and/or zinc such as zinc dithiophosphate (ZDTP) and zinc dithiocarbonate (ZDTC). These compounds can pass from the engine and accumulate on the emission treatment catalyst, which can cause catalyst poisoning and deactivation. Sulfur in diesel fuel also has a major negative impact on catalyst performance. These poisons may accumulate on the surface of a washcoat, creating a physical barrier, or they may interact with the catalytic material in the washcoat, resulting in loss of catalytic activity, and/or become a barrier to particulate filters (such as foam, screens and wall-flow filters). However, the introduction of poisons such as for example, phosphorous, zinc or sulfur, in a DPF with a potassium-rich glass catalyst such as, for example, Glass-1, will not significantly influence the catalytic behavior of the potassium-rich glass.

Because degradation of catalytic activity of potassium-rich glass catalysts occurs due to the depletion of potassium from near the surface region of the catalyst, replenishment of the potassium will improve the catalytic activity and make the catalyst suitable for use in DPFs. The catalytic performance of the glass depends on the potassium ions being replenished at the surface through a leaching process. In addition, as described below, the potassium leaching rate also may be affected by the glass composition, composition of reaction gas, the soot/glass contact, and/or size of glass particles.

A high content of network modifiers (especially potassium) can be disadvantageous for the stability and durability of glasses. The presence of network modifiers will break A-O-A bonds (where A is the cation in the network-formers) and create non-bridging oxygen, which reduces connectivity of the glass network and, therefore, decreases the chemical resistance. With more modifiers in the glass, faster potassium leaching occurs, which yields a lower activity degradation rate. However, increasing the percentage of $K_2O$ favors a more rapid flux of potassium ions to the surface upon depletion and, therefore, a reduced activity degradation rate. Hence, it also is possible that the depleted region does not extend as far into the glass so the glass with a higher percentage of $K_2O$ has more potassium in the depleted region, and so degrades more slowly.

In alternative examples, various substitutions may be included in the composition of the glass. For example, phosphate may be introduced to produce phosphate glasses, which are often used as controlled released glasses in biological applications. Phosphate glasses typically dissolve more rapidly than silicate glasses due the asymmetry of the $PO_4$ tetrahedron unit. The dissolution of phosphate glasses in an aqueous medium is realized by the breakage of P—O—P bonds in the phosphate network within the hydrate layer. Substitution of $SiO_2$ by $P_2O_5$ completely or partially may increase the potassium leaching rate. The addition of $P_2O_5$ makes the glass easier to melt, and as the percentage of $P_2O_5$ is decreased, the melting point increases. For example, when P-60-glass (i.e., approximately 60% $P_2O_5$, 30% $K_2O$ and 10% CaO) is used as the catalyst, the ignition temperature may be approximately 550° C., and when P-20-glass (i.e., approximately 20% $P_2O_5$, 30% $K_2O$, 10% CaO and 40% $SiO_2$) is used, the ignition temperature may be about 535° C., where the ignition temperature for Glass-1 is about 500° C. The exotherm from soot combustion could lead to melting of phosphate glasses, leading to soot encapsulation by the glass. This will keep oxygen from reaching the soot particles, which might cause an incomplete combustion of the soot.

Cerium may also be substituted into the glass formulation. Cerium is often used as a fuel additive to remove soot from DPFs. When used in glass catalysts, cerium may increase the activity of the glass. In other examples, chromium (e.g., in the form of $Cr_2O_3$) may be substituted for some of the $SiO_2$. Chromium may also enhance the activity stability of glass catalysts.

In further examples, alumina may be used as a substitute. Glasses with a relatively low $SiO_2+Al_2O_3$ content have temporary increases in the leaching rate of potassium and other cations when initially exposed to water. Alumina may also raise the softening temperature. In particular, 5-7.5% $Al_2O_3$ may provide a glass of approximately 50% $SiO_2$, 40% $K_2O$ and 10% CaO with a high softening temperature and catalytic activity. As noted above, a decrease of the percentage of $K_2O$ will enhance the glass chemical durability, decrease the replenishment rate of potassium, and increase the degradation rate of the glasses activity. When $K_2O$ is substituted by $Al_2O_3$ in a glass with the remaining composition remaining fixed, the glasses degrade at a similar rate. Thus, the substitution of $K_2O$ by $Al_2O_3$ can counteract the acceleration of degradation due to the decreased percentage of $K_2O$.

Figure 7:
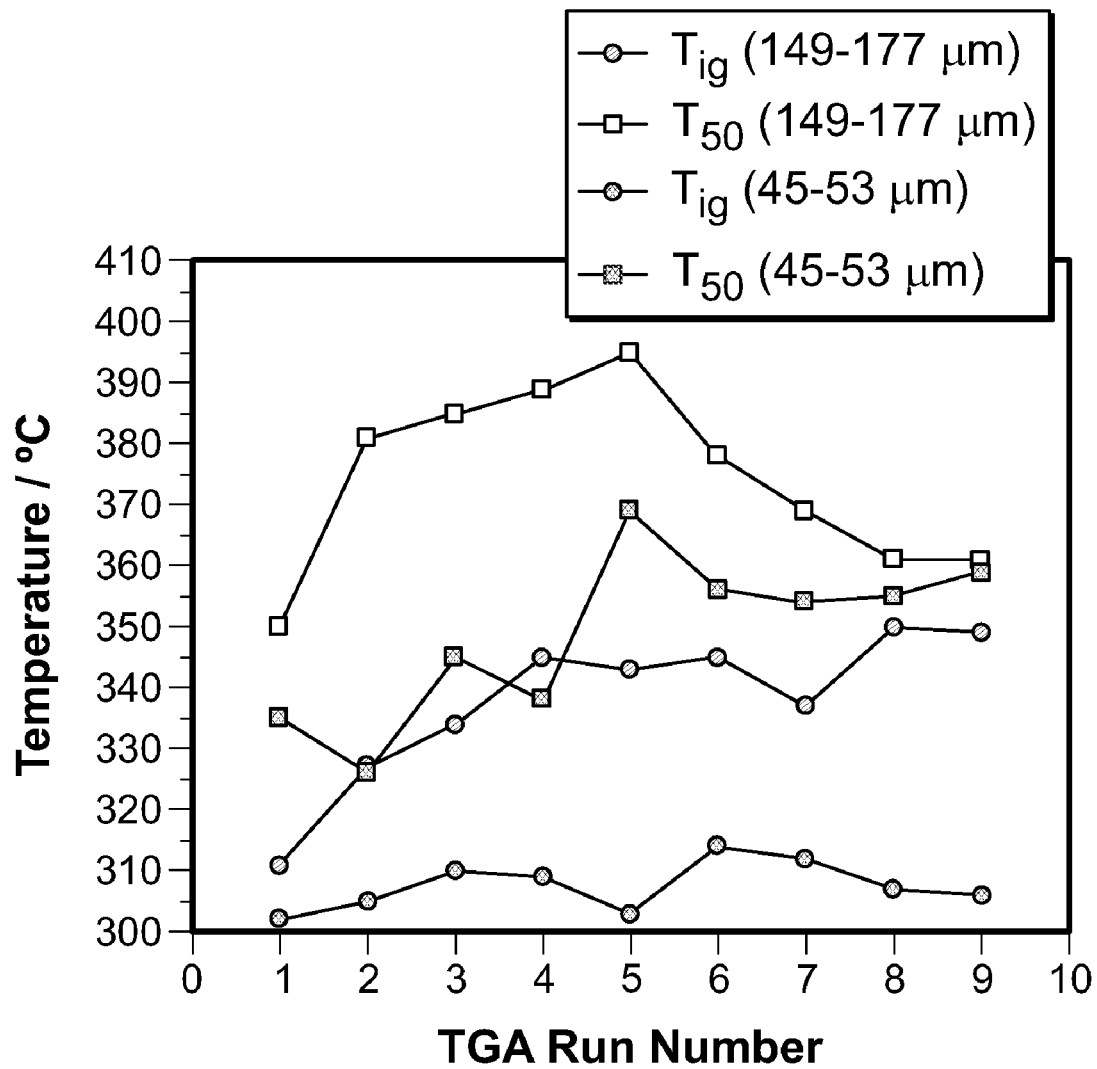
FIG. 7 is a graph showing the ignition temperature ($T_{ig}$) and $T_{50}$ values for an example series of thermogravimetric analysis runs for glass catalysts comprising particles of varying sizes.

Furthermore, the activity is affected by the size of the particles of the catalyst. The smaller the glass particle size, the larger surface area the catalyst has, the faster the leaching of potassium may be and the more stable the catalytic activity the glass provides. FIG. 7 is a graph that illustrates that in one example, the ignition temperature and the $T_{50}$ is generally lower when the particle size is smaller.

Figure 8:
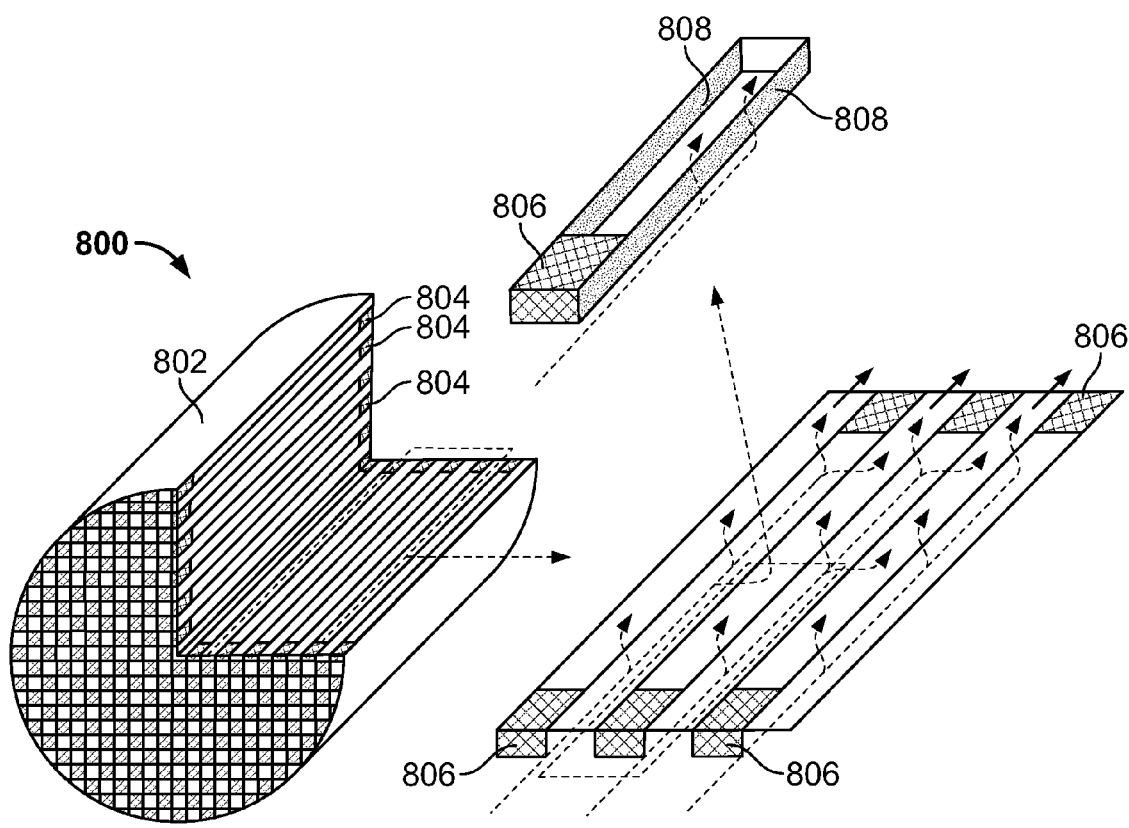
FIG. 8 is a partial cross-sectional and exploded view of an example diesel particulate filter.

An example DPF 800 is shown in FIG. 8. The DPF 800 is designed to be positioned in the exhaust of a vehicle and collect solid and liquid particulate emissions such as, for example, soot. The DPF 800 is able be able to constantly withstand the high temperatures of diesel exhaust gas (e.g., up to approximately 975 K). The DPF 800 may also be subject to temperatures over 1250 K that are caused by exothermic reactions during oxidation of soot trapped in the DPF 800. In addition, the pressure drop over the DPF 800 should be low to avoid decreasing engine performance. The example DPF 800 includes a wall flow monolith 802, which is a high efficiency filter that may be made of cordierite or silicon carbide. Other example filters may include ceramic foam, candle filters, wire mesh, metal wool, and/or any type of suitable substrate. The example monolith 802 is a ceramic structure that include parallel channels 804, of which half are closed at the upstream end in an alternate, checkerboard manner, and the other half are closed at the downstream end by, for example, a ceramic plug 806. The channels 804 have porous walls 808 through which exhaust gases are forced. The walls 808 act as filters and trap particulates. Collected particulates in the DPF 800 accumulate over time and block the micropores of the walls 808 of the channels 804, which increases the back pressure drop of the diesel engine and reduces the engine performance. To maintain maximum performance, the DPF 800 should be regularly regenerated or cleaned by, for example, periodically burning the accumulated particles, i.e., soot combustion, as detailed above. Because the spontaneous combustion temperature of carbon (soot) is about 600° C., and the temperature of diesel exhaust is in the range of 150-400° C., external energy would be needed to heat the diesel exhaust to the temperature necessary for soot combustion. However, catalytic regeneration of the DPF 800, which may occur by adding a catalyst such as, for example the above-described Glass-1 catalyst or any other potassium or other alkali-doped catalysts, lowers the ignition temperature of the soot to a temperature within the range of the temperature of diesel exhaust.

The catalyst shown in FIG. 5 is a Glass-1 catalyst that is coated via annealing onto a cordierite substrate, as typically used in a DPF. Alternately, the catalyst may be applied by injecting the catalyst into the channels 804 or upstream from the DPF 800 or coating the channels 804 with the catalyst (i.e., a washcoat).

In other possible implementations, metal wires comprising a filter can be coated by the glass. Additionally, glass catalysts can be spun into fibrous form and woven to form a filter, or glass beads or pellets can be used to fill a canister and provide filtration. In addition the glass may be incorporated by bonding glass particles to the substrate by a sintering process or, alternatively, by reacting precursor components in situ on a substrate, There may be several applications for the DPF 800 including, for example, to replace or augment conventional filters such as, for example, the above-described Flow-Through Oxidation Catalysts, $NO_x$-Aided Continuously Regenerated Trap, and/or Integrated Catalytic Trap.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A diesel soot filter comprising:
an inlet, an outlet, and a fluid path therebetween, wherein an exhaust gas having soot therein moves from the inlet to the outlet through the fluid path;
a substrate having a surface disposed at least partially within the fluid path and a glass catalyst disposed on the surface of the substrate such that the exhaust gas contacts at least a portion of a surface of the glass catalyst as the exhaust gas moves from the inlet to the outlet;
a plurality of alkali metal ions disposed within the glass catalyst and releasable to the surface of the glass catalyst at a controlled rate sufficiently fast to supplement the lost alkali metal ions at the surface of the glass catalyst and sufficiently slow to extend the catalytic lifespan of the filter, wherein the alkali metal ions combust with the soot as the exhaust gas travels along the fluid path, and
wherein the composition by weight percentage of an oxide basis of the glass catalyst is about 35-85% $SiO_2$, 15-65% $K_2O$, and 0-15% CaO.

2. A method of lowering the ignition temperature of a substance, the method comprising:
placing a host matrix of a glass catalyst in proximity with the substance to be combusted;
exposing an exhaust gas containing the substance to the glass catalyst, a surface of the glass catalyst including an alkali metal ion;
combusting the substance with the alkali metal ion;
replenishing the alkali metal ion by releasing the alkali metal ion to the surface of the glass catalyst at a controlled rate;
wherein the alkali metal ions are mobile in the host matrix of the glass catalyst,
wherein the controlled rate is sufficiently fast so as to supplement the lost alkali metal ions at the surface of the glass catalyst and sufficiently slow as to extend a catalytic lifespan of the glass catalyst, and
wherein the composition by weight percentage of an oxide basis of the glass catalyst is about 35-85% $SiO_2$, 15-65% $K_2O$, and 0-15% CaO.

3. A method of eliminating particulate emissions in an exhaust gas comprising:

exposing the exhaust gas containing the particulate emissions to a surface of a glass catalyst disposed on a substrate, the surface of the glass catalyst including an alkali metal ion;

combusting the particulate emissions with the alkali metal ion;

replenishing the alkali metal ion by releasing the alkali metal ion to the surface of the glass catalyst at a controlled rate;

wherein the controlled rate is sufficiently fast so as to supplement the lost alkali metal ions at the surface of the glass catalyst and sufficiently slow so as to extend a catalytic lifespan of the catalyst, and wherein the composition by weight percentage of an oxide basis of the glass catalyst is about 35-85% $SiO_2$, 15-65% $K_2O$, and 0-15% CaO.

4. A method as defined in claim 3, further comprising keeping an ignition temperature of the particulate emissions substantially constant, without the addition of additional alkali metal ions to the glass catalyst.

5. A method as defined in claim 4, wherein the ignition temperature is below about 350° C.

6. A method as defined in claim 3, wherein the substrate is at least one of a lattice or matrix.

7. A method as defined in claim 6, wherein alkali metal ions are mobile within the glass catalyst.

8. A method as defined in claim 3, wherein extending the catalytic lifespan of the glass catalyst includes reducing sublimation of the alkali metal ions.

9. A method as defined in claim 3, wherein extending the catalytic lifespan of the glass catalyst includes reducing loss of the alkali metal ions to the environment.

10. A method as defined in claim 3, wherein the composition by weight percentage of an oxide basis of the glass catalyst is about 50-55% $SiO_2$, 30-35% $K_2O$, and 10-15% CaO.

11. A method as defined in claim 3, wherein the particulate emissions are soot.

12. A method as defined in claim 3, wherein the substrate further comprises at least one of an inert ceramic or metal carrier in the shape of a honeycomb having walls, wherein flow channels are defined by the walls.

13. A method as defined in claim 3, wherein the glass catalyst is formed by:
combining a network forming oxide, a modifier oxide, and an active catalyst compound to form a mixture;
heating the mixture to achieve melting;
cooling the melted mixture to obtain a glass; and
reducing the glass to at least one of a powder, a coating, or granules of catalyst, wherein the alkaline metal ions are mobile in the glass catalyst.

14. A method as defined in claim 3, wherein the glass catalyst is formed by:
evaporating water from an aqueous solution of potassium and one or more precursors to yield a solid residue; and
calcining the solid residue to form the glass catalyst.

15. A method as defined in claim 13, wherein the alkali ions include at least one of lithium, sodium, potassium, rubidium, or cesium.

16. A method as defined in claim 15, wherein the mixture is in a eutectic field of glasses.

17. A method as defined in claim 13, wherein the composition by weight percentage of an oxide basis of the glass catalyst is about 50-55% $SiO_2$, 30-35% $K_2O$, and 10-15% CaO.

18. An apparatus for eliminating particulate emissions in an exhaust gas comprising:
a filter having an inlet, an outlet, and an fluid path therebetween, wherein the exhaust gas moves from the inlet to the outlet through the fluid path;
a substrate having a surface and a glass catalyst disposed on the surface of the substrate and at least partially within the fluid path such that the exhaust gas contacts at least a portion of a surface of the glass catalyst disposed on the surface of the substrate as the exhaust gas moves from the inlet to the outlet; and
a plurality of alkali metal ions disposed within the glass catalyst and releasable to the surface of the glass catalyst at a controlled rate sufficiently fast to supplement the lost alkali metal ions at the surface of the glass catalyst and sufficiently slow to extend the catalytic lifespan of the filter, wherein the alkali metal ions combust with the particulate emissions as the particulate emissions travel along the fluid path, and
wherein the composition by weight percentage of an oxide basis of the glass catalyst is about 35-85% $SiO_2$, 15-65% $K_2O$, and 0-15% CaO.

19. An apparatus as defined in claim 18, further comprising a plurality of channels formed between the inlet and the outlet, wherein each of the channels forms a fluid path.

20. An apparatus as defined in claim 19, wherein the plurality of channels are formed by at least one of an inert ceramic or metal, and wherein the glass catalyst at least partially coats the formed channels.

21. An apparatus as defined in claim 18, wherein the ignition temperature of the combustion is kept substantially constant without addition of alkali metal ions to the glass catalyst.

22. An apparatus as defined in claim 18, wherein the substrate is at least one of a lattice or matrix.

23. An apparatus as defined in claim 18, wherein the alkali metal ions are mobile within the catalyst.

24. An apparatus as defined in claim 18, wherein the glass catalyst is formed by:
combining a network forming oxide, a modifier oxide, and an active catalyst compound to form a mixture;
heating the mixture to achieve melting;
cooling the melted mixture to obtain a glass; and
reducing the glass to at least one of a powder, a coating, or granules of catalyst, wherein the alkaline metal ions are mobile in the glass catalyst.

25. An apparatus as defined in claim 18, wherein the glass catalyst is formed by:
evaporating water from an aqueous solution of potassium and one or more precursors to yield a solid residue; and
calcining the solid residue to form the glass catalyst.

26. An apparatus as defined in claim 18, wherein the alkali ions include at least one of lithium, sodium, potassium, rubidium, or cesium.

* * * * *